United States Patent [19]

Goepel et al.

[11] Patent Number: 4,716,422

[45] Date of Patent: Dec. 29, 1987

[54] MECHANISM FOR RINSING AN INK PRINTING HEAD

[75] Inventors: Ernst Goepel, Germering; Hans Kusmierz, Gilching, both of Fed. Rep. of Germany

[73] Assignee: Siemens Aktiengesellschaft, Berlin and Munich, Fed. Rep. of Germany

[21] Appl. No.: 883,659

[22] Filed: Jul. 9, 1986

[30] Foreign Application Priority Data

Aug. 12, 1985 [DE] Fed. Rep. of Germany ....... 3528896

[51] Int. Cl.[4] .......................... G01D 15/16; B41J 3/04

[52] U.S. Cl. ................................ 346/140 R; 417/477

[58] Field of Search .................. 346/140, 75; 417/476, 417/477

[56] References Cited

U.S. PATENT DOCUMENTS 4,253,103 2/1981 Heinzl ................................ 346/140

4,359,744 11/1982 Salmre ........................... 346/140 X 4,367,479 1/1983 Bower ............................. 346/140 X

FOREIGN PATENT DOCUMENTS 2914986 10/1980 Fed. Rep. of Germany .

3333626 4/1985 Fed. Rep. of Germany .

3333717 4/1985 Fed. Rep. of Germany .

*Primary Examiner*—Joseph W. Hartary

*Attorney, Agent, or Firm*—Hill, Van Santen, Steadman & Simpson

[57] ABSTRACT

The invention relates to a mechanism for rinsing the nozzles and the ink channels in the print head of an ink printer. A hose pump is composed of a revolute member which is driven by a drive element for the purpose of rinsing; for that purpose, the shaft of the drive element engages via a plug-in coupling and drives the revolute member; at least one puck is rotatably seated in the surface region of the revolute member; as the result of the puck, ink is pumped into the ink channels and nozzles of the print head at every revolution in a clock-wise direction; the drive can ensue motor-driven or manually.

11 Claims, 5 Drawing Figures

MECHANISM FOR RINSING AN INK PRINTING HEAD

BACKGROUND OF THE INVENTION

1. Field of the Invention

The invention relates to a mechanism for rinsing the ink channels and nozzles of a print head in ink printer devices by use of a hose pump arranged between an ink reservoir and an ink distributing system of the print head.

2. Description of the Prior Art

It is most essential for the reliable operation of a print head of an ink printer operating according to what is referred to as the under-pressure method that the ink channels always be completely filled with ink. Contaminations and air or gas bubbles in the channel and/or in the nozzle region lead to considerable disturbances in the function and are not infrequently the reason for the complete outage of the print head. This malfunction can be eliminated by means of a rinsing event wherein ink is pressed through the channel and nozzle region by means of a chronologically limited over-pressure.

A rinsing mechanism is described in German Patent No. 26 10 518 wherein an over-pressure is manually generated for a brief time by actuating a plunger in the print head. When the static under-pressure is restored, the desired, negative ink meniscus is again formed in every nozzle opening. The quantity of ink used by the rinsing procedure, however, can fluctuate within wide limits and can lead to considerable losses and waste problems.

A mechanical device for eliminating dirt particles and air bubbles from the print head of an ink printer means is described in German OS No. 29 14 986 wherein an elastic ink conveying hose includes a portion fashioned as a hose pump which can be brought into contact with a pinch member for conveying ink in the direction of the print head. A relatively long connecting hose leads from the hose pump to the print head in order not to impede its movement. In addition to the risk of mechanical damage to the conveying hose, additional measures against twisting and buckling are to be provided.

SUMMARY OF THE INVENTION

An object of the invention is to provide a hose pump for rinsing a print head which enables both a reduction in the length of the conveying hose as well as a controllable rinsing procedure.

This object is achieved in accord with the invention by providing a hose pump firmly connected to the print head which is composed of a nearly rotationally symmetrical revolute member in whose surface region at least one puck is seated rotatable around its longitudinal axis, whereby at least one pinchable connecting hose lies against the bearing surface of a carrier in the rolling region of the puck. Further, a drive element is provided to turn the revolute member.

The essential advantages of the hose pump of the invention are that the connection between hose pump and print head is only short, that the rinse mechanism can be executed in compact fashion and that the connecting hoses are protected against mechanical damage. Further advantageous developments of the mechanism are that the drive of the hose pumps can ensue on the basis of a motor drive or manually.

BRIEF DESCRIPTION OF THE DRAWINGS

The invention shall be set forth below with reference to exemplary embodiments shown in the drawings. Shown therein are.

DESCRIPTION OF THE PREFERRED EMBODIMENTS

Figure 1:
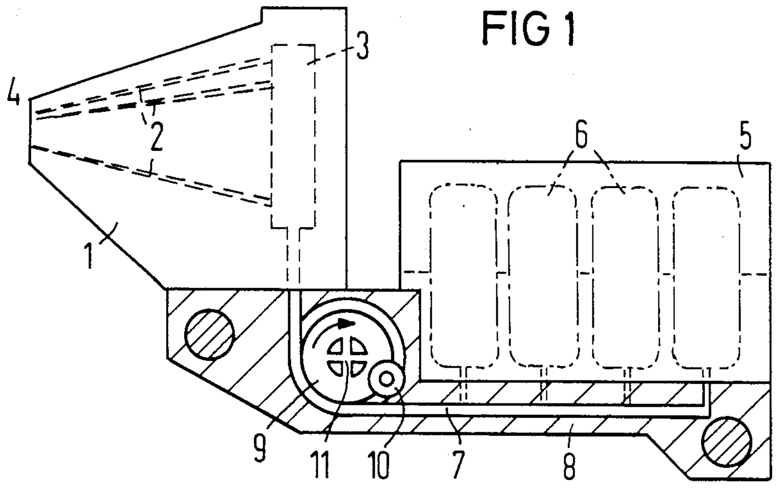
FIG. 1 is a side view of a first exemplary embodiment of a print head of the invention including a motor drive with a carriage shown in section.

A print head 1 is shown in FIG. 1 which contains a plurality of ink channels 2 having one end in communication with an ink distributing system 3 and a second end forming a plurality of discharge openings 4 of the print head 1. The ink distributing system 3 is connected to an ink reservoir 5 which includes four ink containers 6 in the example. The ink containers 6 can, for example, contain ink of various colors. Connecting hoses 7 are provided between the ink containers 6 and the ink distributing system 3. The print head 1 and the ink supply system 6, 7 form a structural unit and are mounted on what is referred to as a carriage 8 which is movable back and forth in front of a recording medium line-by-line. A hose pump 9 which is composed of a nearly rotationally-symmetrical revolute member is provided in order to rinse the ink channels and the nozzles of the print head 1. The revolute member 9 includes a plug-in coupling 11 via which, as shall be set forth later, it is driven by a drive element by means of a shaft. The connecting hoses 7 lie in an annular groove 9*a* formed in the revolute member 9. This can occur without great curvature, so that the hoses are not pinched in the idle position of the hose pump. A rotatable puck 10 is mounted at the circumference of the revolute member in the example. When the revolute member 9 is then rotated in clockwise direction (arrow direction in FIG. 1), the puck 10 pinches the connecting hoses 7 against the hose bed in the carriage 8 and, due to further rotation, conveys ink to the nozzles in the print head 1. The rinsing operation can be optimized by the number and speed of the revolutions, i.e. the rinsing volume can also be controlled.

Figure 2:
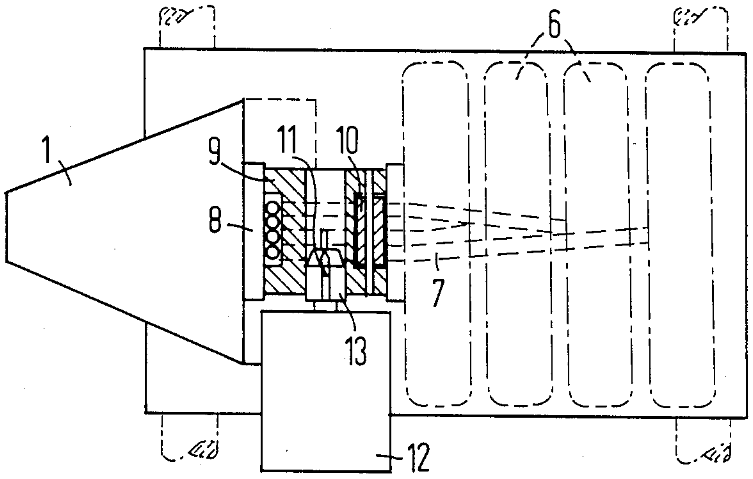
FIG. 2 is a sectional view of the print head of FIG. 1.

In FIG. 2, a motor 12 which engages into the plug-in coupling 11 via a shaft 13 and turns the revolute member 9 is provided as drive element. In this example, the motor 12 is secured to the carriage 8. The embodiment represents a simple and reliably functioning arrangement which, moreover, can also be acutated via the control of the print head and enables a controlled rinsing.

Figure 3:
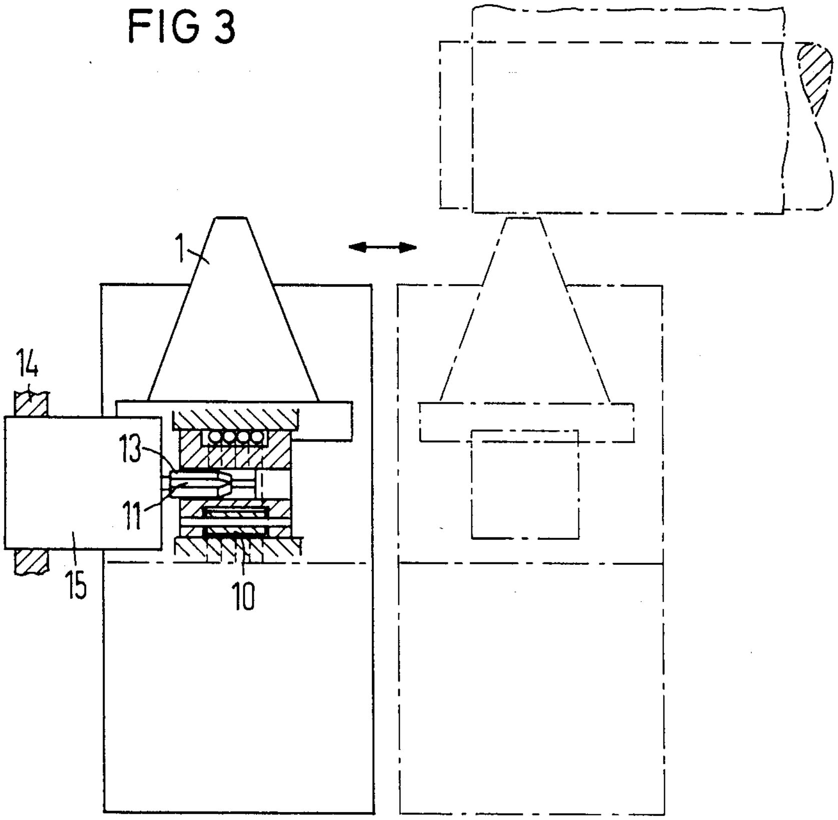
FIG. 3 is a second exemplary embodiment of the invention including a motor drive.

In the second exemplary embodiment shown in FIG. 3, a motor 15 is fastened to what is referred to as the printer chassis 14. This solution to the problem addressed by the invention is available in ink printer means whose carriage enters into what is referred to as a parking position in the idle condition or in printing pauses. FIG. 3 shows the print head 1 in this parking position into which it proceeds from a printing or writing position (shown in broken lines). In such a position, which shall not be discussed in greater detail here, the nozzle exit face of the print head is cleaned and the nozzle exit apertures are covered and closed for the duration of the printing or operating pauses. The thorough rinsing of the ink channels and of the nozzles of the print head 1, before closing or after the release of the nozzle exit face of the print head 1, ensues in that the motor 15 engages into the plug-in coupling 11 via the shaft 13 when the parking position is reached. The weight of the carriage is reduced as a result of the separate attachment of the motor 15 to the printer chassis 14, this having a positive influence on the acceleration and deceleration behavior during the printing process.

The invention, however, is not limited to the employment of a motor as drive element. On the contrary, it lies within the scope of the invention to also manually actuate the hose pump. Exemplary embodiments thereof are shown in FIGS. 4 and 5.

In the exemplary embodiment of FIG. 4 which again shows the print head 1 including the ink reservoir 5 containing the individual ink containers 6, a ratchet wheel 16 connected with the revolute member (covered in this illustration) is provided, three ratchet teeth 20 thereof (in this example) being uniformly distributed over the circumference of the ratchet wheel 16. The number of ratchet teeth 20 corresponds to the number of pucks 10 distributed over the circumference of the revolute member. The ratchet wheel 16 is connected to an operating arm 19 via a coupling system 17, 18. The operating arm 19 can thereby simultaneously serve as the actuation element for a cleaning and covering means (shown in broken lines here) for the nozzle exit openings 4 of the print head 1. When the end of the operating arm 19 is pivoted toward the left to the position shown with broken lines, then respectively one puck 10 is moved via the coupling system 17, 18, this thereby seizing a partial segment of the connecting hoses 7 and, so to speak, pinching these together. The quantity of ink corresponding to the volume pinched off is thereby respectively conveyed into the print head, i.e. the ink channels and the nozzles of the print head are thoroughly rinsed. No movement of the ratchet wheel 16 ensues during the return motion of the operating lever 16 into its initial position.

Figure 5:
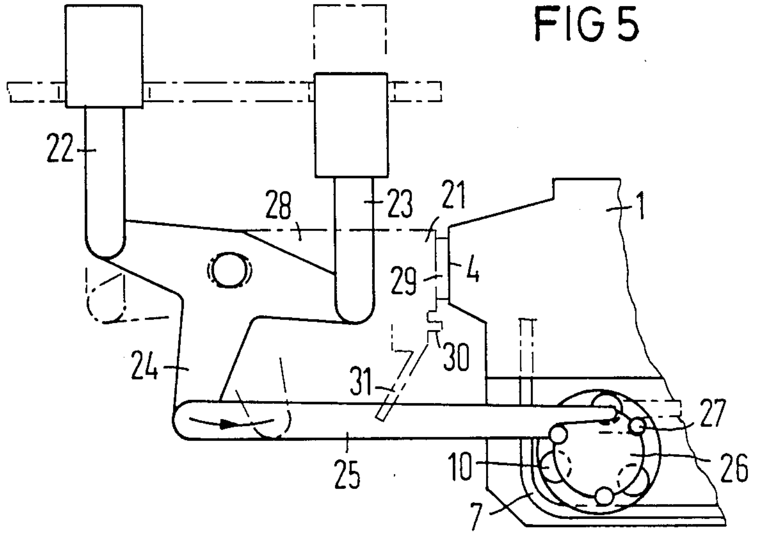
FIG. 5 is a fourth exemplary embodiment including a manual drive.

The exemplary embodiment of FIG. 5 likewise shows a manually actuatable rinsing mechanism for the print head 1. The drive herein is realized by two keys 22, 23 which act on a rotatably seated lever 24 to which a connecting rod 25 is hinged. The drive can simultaneously serve for the manual actuation of a cleaning and cover device as shown in broken lines in FIG. 5. The revolute member of the hose pump is, for example, connected to a pin wheel 26 via a common shaft, three transmission pins 27 being arranged on this pin wheel 26 in the exemplary embodiment uniformly distributed over the circumference thereof. The number of transmission pins 27 thereby corresponds to the number of pucks 10 arranged distributed over the circumference of the revolute member (covered here). When, proceeding from the position shown in FIG. 5, the left-hand key 22 is actuated, then the lever 24 and the connecting rod 25 assume the position indicated with broken lines. The connecting rod 25 thereby engages into one of the transmission pins 27 of the pin wheel 26 and thereby rotates the pin wheel 26 as well as the revolute member connected thereto. One of the pucks 10 thereby seizes a partial segment of the connecting hoses 7, whereby a quantity of ink corresponding to the volume pinched off is conveyed into the print head 1. By actuating the right-hand key 23, the connecting rod 25 is moved back into the initial position without moving the pin wheel 26.

Figure 4:
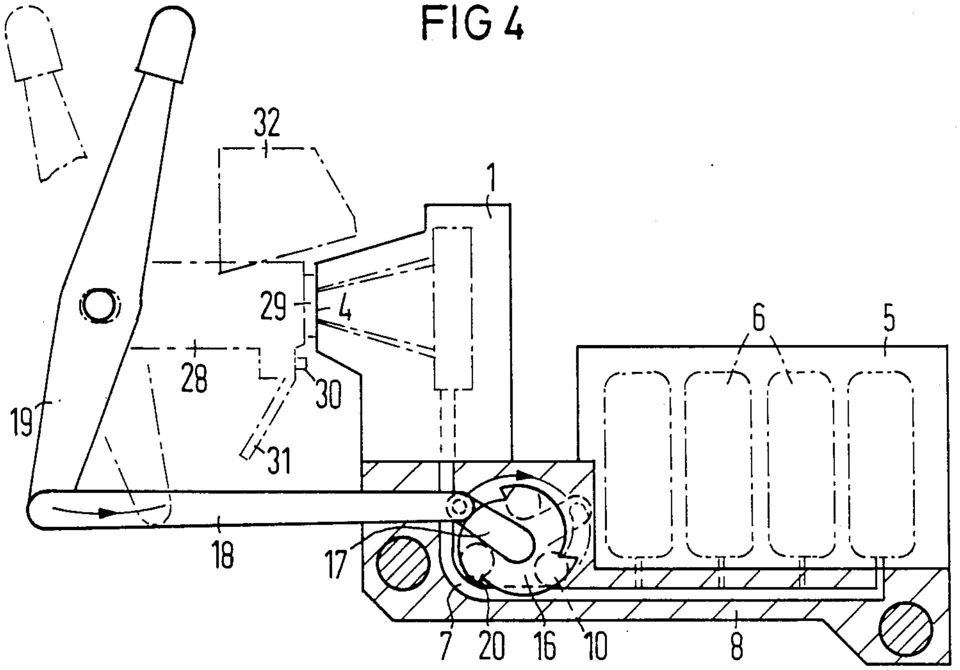
FIG. 4 is a third exemplary embodiment including a manual drive.

As already set forth in the description of FIGS. 4 and 5, it is advantageous given employment of a manual drive to combine this with the cover and cleaning device for the nozzle exit face of the print head. This possibility has been shown in broken lines in FIGS. 4 and 5.

Such a cover and cleaning device is composed of a closing rocker 28 which is pivotable by means of an operating arm 19 (FIG. 4) or the operating keys 22 and 23 (FIG. 5). At the end face, i.e. facing the nozzle exit face 4 of the print head 1, the closing rocker 28 carries a sealing element 29, a stripper element 30 as well as a splatter shield 31. The device can be expanded by a covering 32. By pivoting the closing rocker 28 between what is referred to as a waiting position during which the end surface of the closing rocker 28 is located within the covering, and a cover or closing position during which the sealing element 29 covers the nozzle exit face 4 of the print head 1, both the nozzle exit face 4 as well as the sealing element 29 are cleaned. The functional interaction of the actuation of the closing rocker 28 with the actuation of the hose pump advantageously enables the print head 1 to always be rinsed through or jetted free when the closing rocker 28 is situated in an upper final position, since the waste ink emerging from the nozzles of the print head 1 are then eliminated by means of the splatter shield 31.

It is advantageous to select the basic position of the hose pump such that the pucks 10 are at a distance from the connecting hoses 7, so that the under-pressure acquired for the print mode can be established unimpeded in the print head 1.

The invention is not limited to either a specific design of the plug-in coupling 11 or to a specific design of the revolute member 9. For example, in case the drive element is mounted on the carriage, a permanent connection of the shaft to the revolute member can also be employed. The revolute member can, for example, comprise a cylindrical shape. In this case, the puck is rotatably seated in the region of the cylinder surface so that one part of its circumference projects beyond the revolute member. As a result of grooves fashioned in the carrier of the carriage in the region of the pinchable connecting hoses, the latter can be conducted somewhat let-in. An adaptation to materials of the connecting hose which exhibit different elasticity can thereby ensue. Of course, the invention is likewise not limited to the number of four connecting hoses shown in the exemplary embodiments.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A mechanism for rinsing the ink channels and nozzles of a print head in printer devices upon employment of a hose pump which is firmly connected to the print head and in which the connecting hoses guided over the hose pumps are grasped and pinched by a puck, with the connecting hoses arranged between the ink reservoir and the ink distributing system of the print head, comprising the improvement wherein the connecting hoses are guided over a revolute member having on its outer surface at least one annular groove, the connecting hoses projecting into a sector of the annular groove, whereby at least one section of the pinchable connecting hose lies against a bearing surface of a carrier in the rolling region of the puck, the puck connected to the revolute member being seated rotatable around its longitudinal axes, whereby said puck is situated within the annular groove and a drive element being provided, by means of which the revolute member can be turned.

2. A mechanism according to claim 1, wherein said puck projects beyond the surface region of the revolute member in a radial direction.

3. A mechanism according to claim 1, wherein the bearing surface of the carrier is rounded off and includes grooves corresponding to the length of the puck into which a connecting hose is laid.

4. A mechanism according to claim 1, wherein a motor is provided for the actuation of the revolute member, said motor being arranged on the carriage which carries the print head and the ink reservoir.

5. A mechanism according to claim 1, wherein a motor is provided for the actuation of the revolute member, said motor being arranged on the chassis of the ink printer means; in that the revolute member includes a central plug-in coupling into which a shaft of the drive element engages when the print head enters into a parking position.

6. A mechanism according to claim 1, wherein a manually actuatable operating arm is provided for the actuation of the revolute member, said operating arm engaging via a coupling system into a ratchet wheel connected to the revolute member, the number of ratchets of said ratchet wheel distributed over the circumference thereof corresponding to the number of pucks arranged distributed over the circumference of the revolute member.

7. A mechanism according to claim 1, wherein a manually actuatable key arrangement is provided for the actuation of the revolute member in that respectively one key acts on a rotatably seated lever and dislocates a connecting rod connected to the lever and in that a pin wheel connected to the revolute member is provided, the connecting rod attacking at the transmission pins of said pin wheel which are distributed over the circumference thereof.

8. A mechanism according to claim 1, wherein the hose pump and a cover and cleaning mechanism are actuated by a common drive.

9. A mechanism for rinsing the ink channels and nozzles of a print head in printer devices upon employment of a hose pump which is firmly connected to the print head and in which the connecting hoses guided over the hose pumps are grasped and pinched by a puck, with the connecting hoses arranged between the ink reservoir and an ink distributing system of the print head comprising:

- a revolute member having an annular groove on its outer surface,
  - the connecting hoses being guided over said revolute member and projecting into a sector of said annular groove,
- a carrier member in which said revolute member is mounted, said carrier members having a bearing surface against which said pinchable connecting hoses lie,
  - said puck being connected to said revolute member, rotatable about its longitudinal axis, being seated in said annular groove and being rollable in a region including said carrier member bearing surface, and
- a drive means for turning said revolute member, whereby, as said revolute member is rotated, said puck will periodically engage and pinch said hose causing ink therein to pass into said ink distributing system to rinse the ink channels and nozzles of said print head.

10. A mechanism according to claim 9, wherein said puck projects beyond the surface of the revolute member in a radial direction.

11. A mechanism according to claim 9, including a plurality of pucks are connected to said revolute member.

* * * * *